United States Patent
Tachibanada et al.

(10) Patent No.: US 10,371,253 B2
(45) Date of Patent: Aug. 6, 2019

(54) POWER TRANSMISSION CONTROL DEVICE, AND POWER TRANSMISSION OR VEHICLE INCLUDING THE SAME

(71) Applicant: Honda Motor Co.,Ltd., Tokyo (JP)

(72) Inventors: Yuya Tachibanada, Saitama (JP); Yutaka Ishikawa, Saitama (JP)

(73) Assignee: Honda Motor Co.,Ltd., Tokyo (JP)

( * ) Notice: Subject to any disclaimer, the term of this patent is extended or adjusted under 35 U.S.C. 154(b) by 0 days.

(21) Appl. No.: 15/913,930

(22) Filed: Mar. 7, 2018

(65) Prior Publication Data

US 2018/0266544 A1 Sep. 20, 2018

(30) Foreign Application Priority Data

Mar. 15, 2017 (JP) .................................. 2017-049768

(51) Int. Cl.
*F16H 59/72* (2006.01)
*F16H 61/00* (2006.01)
(Continued)

(52) U.S. Cl.
CPC ......... *F16H 61/0021* (2013.01); *F16H 59/72* (2013.01); *F16H 61/0206* (2013.01); *F16H 63/3483* (2013.01); *F16H 59/74* (2013.01); *F16H 2059/746* (2013.01); *F16H 2061/0034* (2013.01); *F16H 2312/14* (2013.01)

(58) Field of Classification Search
None
See application file for complete search history.

(56) References Cited

U.S. PATENT DOCUMENTS 6,258,008 B1 *  7/2001 Tabata ............... B60K 6/365 477/107
2009/0143193 A1 *  6/2009 Ohshima ............. F16H 61/0021 477/50

(Continued)

FOREIGN PATENT DOCUMENTS

| JP | 2005048782 | 2/2005 |
| JP | 2016-176589 | 10/2016 |

OTHER PUBLICATIONS

"Office Action of Japan Counterpart Application", dated Jan. 8, 2019, with English translation thereof, p. 1-p. 11.

*Primary Examiner* — Justin Holmes
(74) *Attorney, Agent, or Firm* — JCIPRNET

(57) ABSTRACT

A power transmission includes a first brake, a pressure regulating valve, an accumulator, an oil temperature sensor, a second electromagnetic valve allowing supply of working oil to a piston, and a power transmission control device. The power transmission control device includes a memory relating and storing a working oil temperature and a permission time configured to allow release of the accumulator, and a receiver unit receiving a starting request. The accumulator is connected such that the working oil, in which the pressure is accumulated, can be supplied to the first brake and the piston. The power transmission control device sets a permission time corresponding to a temperature of the working oil on the basis of the memory. The working oil, in which the pressure is accumulated, is supplied to the first brake only during the permission time when restart information is received, while a vehicle performs idling stop control.

6 Claims, 4 Drawing Sheets

(51) Int. Cl.
    *F16H 63/34*     (2006.01)
    *F16H 61/02*     (2006.01)
    *F16H 59/74*     (2006.01)

(56) References Cited

U.S. PATENT DOCUMENTS

| | | | |
|---|---|---|---|
| 2010/0167874 A1* | 7/2010 | Shirasaka | F16H 61/0021 477/86 |
| 2011/0039657 A1* | 2/2011 | Gibson | F16H 61/0031 477/115 |
| 2016/0245400 A1* | 8/2016 | Kobayashi | F16H 61/0276 |

\* cited by examiner

POWER TRANSMISSION CONTROL DEVICE, AND POWER TRANSMISSION OR VEHICLE INCLUDING THE SAME

CROSS-REFERENCE TO RELATED APPLICATION

This application claims the priority benefit of Japan application serial no. 2017-049768, filed on Mar. 15, 2017. The entirety of the above-mentioned patent application is hereby incorporated by reference herein and made a part of this specification.

BACKGROUND

Technical Field

The present disclosure relates to a power transmission control device configured to control a power transmission, and a power transmission or a vehicle including the same.

Description of Related Art

In the related art, a power transmission control device configured to supply a hydraulic pressure from a pressure accumulator to an engaging mechanism until sufficient hydraulic pressure is provided by a driving source when a vehicle returns from an idling stop and departs is known (for example, see Patent Document 1).

[Patent Document 1] Japanese Unexamined Patent Application Publication No. 2016-176589

SUMMARY

When a pressure accumulator is used for two purposes, i.e., engagement of an engaging mechanism during returning from an idling stop state and movement of a parking piston of a parking lock mechanism to a locking side in a state in which a driving source is stopped, a pressure accumulated by the pressure accumulator needs to remain to move the parking piston toward the locking side also immediately after returning from the idling stop state.

In consideration of the above-mentioned circumstances, the present disclosure is directed to providing a power transmission control device capable of appropriately applying a parking lock using a pressure accumulated by a pressure accumulator.

In order to accomplish the above-mentioned object, the present disclosure is a power transmission control device (for example, a transmission control unit (14), the same below) configured to control a power transmission (for example, a power transmission (PT) of the embodiment, the same below), the power transmission including:

an engaging mechanism (for example, a first brake (B1) of the embodiment, the same below) that is fastened upon departure of a vehicle (for example, a vehicle (V) of the embodiment, the same below);

a pressure regulating valve (for example, a pressure regulating valve (19) of the embodiment, the same below) configured to regulate a pressure of a working fluid (for example, working oil of the embodiment, the same below) for the engaging mechanism;

a pressure accumulator (for example, an accumulator (21) of the embodiment, the same below) configured to accumulate a pressure in the working fluid;

a temperature detecting unit (for example, an oil temperature sensor (37) of the embodiment, the same below) configured to detect a temperature of the working fluid;

a parking piston (for example, a parking piston (13) of the embodiment, the same below) configured to switch between locking and unlocking of a parking lock mechanism; and an opening/closing valve (for example, a second electromagnetic valve (25) of the embodiment, the same below) configured to allow supply of the working fluid to the parking piston to switch the parking piston to a locked side, the power transmission control device including:

a storage unit (for example, a memory (14a) of the embodiment, the same below) configured to relate and store a temperature of the working fluid and a permission time in which release of the pressure accumulator is allowed, and a receiver unit (for example, a receiver unit (14b) of the embodiment, the same below) configured to receive restart information (for example, a starting request of the embodiment, the same below) of a prime mover (for example, an engine (E) of the embodiment, the same below) mounted on the vehicle, the vehicle is able to execute idling stop control that stops the prime mover upon halting (for example, idling stop of the embodiment, the same below), the pressure accumulator is connected to supply the working fluid, in which the pressure is accumulated, for the engaging mechanism and the parking piston, and the power transmission control device sets the permission time corresponding to the temperature of the working fluid detected by the temperature detecting unit on the basis of memory in the storage unit, and the working fluid, in which the pressure is accumulated by the pressure accumulator, is supplied to the engaging mechanism only during the permission time when restart information of the prime mover is received, while the vehicle performs the idling stop control.

An amount of working fluid such as working oil or the like leaking from a gap in a valve varies as viscosity or the like varies according to a temperature thereof. Accordingly, even when a pressure accumulated by a pressure accumulator is sufficient at the time of a low temperature, the accumulated pressure may be insufficient at the time of a high temperature. Accordingly, the accumulated pressure may be preserved such that parking locking is possible also at the time of a high temperature, but when the remaining pressure is to be used as a pressure for engagement of the engaging mechanism, unnecessary accumulated pressure remains in the pressure accumulator at the time of a low temperature, and this accumulated pressure may be wasted.

Here, in the present disclosure, the permission time used to allow the pressure to accumulate used in the engaging mechanism is selected according to the temperature of the working fluid. Accordingly, since an accumulated pressure sufficient for allowing the parking lock to be locked at the time of a low temperature because a leakage rate is reduced at the time of a low temperature can remain such that the pressure accumulated in the pressure accumulator can be used in the engaging mechanism, an appropriate accumulated pressure can remain for the parking lock according to the temperature of the working fluid, and wasting of the accumulated pressure can be prevented.

In addition, in the present disclosure, when the temperature detected by the temperature detecting unit is a predetermined upper limit temperature (for example, a predetermined upper limit value ($\theta 2$) of the embodiment, the same below) or more, even if the restart information of the prime mover is received, supply of the working fluid, in which the pressure is accumulated by the pressure accumulator for the engaging mechanism, is preferably prohibited.

According to the present disclosure, when the temperature of the working fluid is increased excessively, the entire pressure accumulated in the pressure accumulator can remain for the parking lock without using the entire accumulated pressure for engagement of the engaging mechanism upon returning to the idling.

In addition, a power transmission of the present disclosure may be configured to include the above-mentioned power transmission control device, the engaging mechanism that is fastened upon departure of the vehicle, the pressure regulating valve configured to regulate a pressure in the working fluid for the engaging mechanism, the pressure accumulator configured to accumulate a pressure in the working fluid, and the temperature detecting unit configured to detect a temperature of the working fluid.

In addition, a vehicle of the present disclosure may be configured to include the above-mentioned power transmission, the prime mover configured to transmit power to the power transmission, and drive wheels (for example, front wheels (WFL, WFR) of the embodiment, the same below) to which power output from the power transmission is transmitted.

DESCRIPTION OF THE EMBODIMENTS

Figure 1:
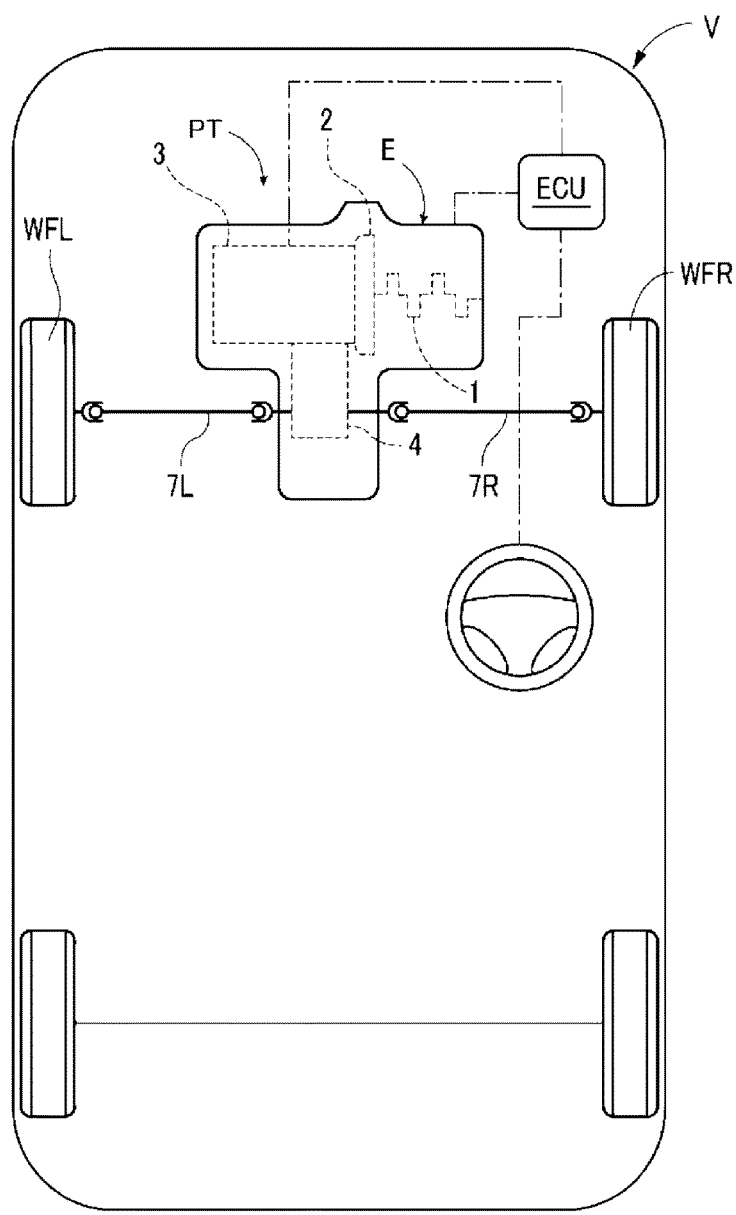
FIG. 1 is a view for describing a vehicle on which a power transmission of an embodiment is mounted.

As shown in FIG. 1, in a vehicle V of an embodiment using a power transmission control device of the present disclosure, an engine E (an internal combustion engine or a driving source, an electric Motor may be used instead of the engine E) is mounted sideways in a vehicle body such that a crankshaft 1 of the engine E is directed in a vehicle body leftward/rightward direction. A driving force output from the engine E is transmitted to a power transmission PT. Thus, the power transmission PT adjusts the driving force of the engine to correspond to a selected gear ratio and transmits the adjusted driving force to left and right front wheels WFL and WFR.

The power transmission PT is constituted by an automatic transmission 3 having a torque converter 2 connected to the crankshaft 1, and a front differential gear 4 connected to the automatic transmission 3.

The front differential gear 4 is connected to the left and right front wheels WFL and WFR via a front section left axle 7L and a front section right axle 7R.

Figure 2:
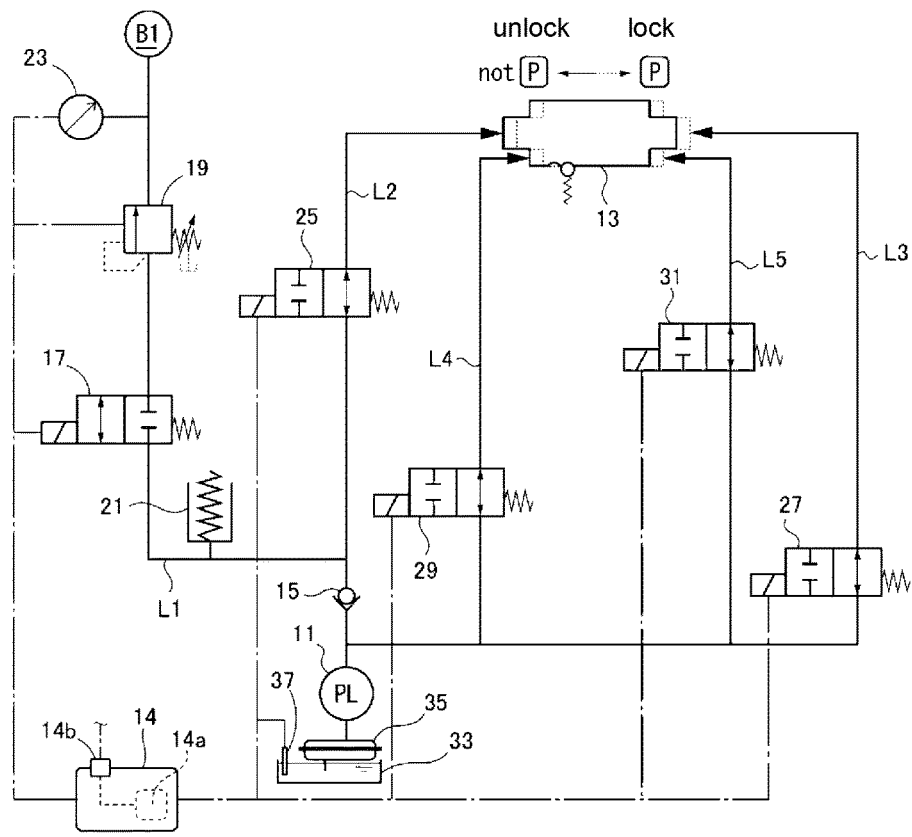
FIG. 2 is a view for schematically describing the power transmission of the embodiment.

FIG. 2 is a view schematically showing some of parts that constitute the automatic transmission 3. While the automatic transmission 3 includes a plurality of engaging mechanisms, in FIG. 2, only a first brake B1 having wet type multiple disks, which is one of the plurality of engaging mechanisms, is shown. The first brake B1 is an engaging mechanism that is fastened (engaged) upon departure of the vehicle V.

The automatic transmission 3 includes an oil pump 11 configured to discharge working oil using a driving force of the engine E, a first oil path L1 configured to guide the working oil discharged from the oil pump 11 to the first brake B1 having a working oil pressure, a parking piston 13 configured to switch between locking and unlocking of a parking lock mechanism (not shown), second to fifth oil paths L2 to L5, of which there are four, configured to supply a working oil pressure to the parking piston 13, and a transmission control unit 14. A regulator valve (not shown) is connected to the first oil path L1, and a line pressure in the first oil path L1 is adjusted by the regulator valve.

A check valve 15, a first electromagnetic valve 17 and a pressure regulating valve 19 are installed in the first oil path L1 in sequence from the oil pump 11 toward the first brake B1. In addition, an accumulator 21 disposed between the check valve 15 and the first electromagnetic valve 17 is connected to the first oil path L1. The accumulator 21 accumulates a working oil pressure while the oil pump 11 rotated using a driving force for vehicle traveling of the engine E is operated.

In addition, a hydraulic pressure sensor 23 disposed between the pressure regulating valve 19 and the first brake B1 is connected to the first oil path L1. The pressure regulating valve 19 adjusts a working fluid pressure shared with the first brake B1.

Second to fifth electromagnetic valves 25, 27, 29 and 31, of which there are four, are installed in the second to fifth oil paths L2 to L5, respectively. The first electromagnetic valve 17 is a normal closed type, and the second to fifth electromagnetic valves 25, 27, 29 and 31 are normal open types.

The second oil path L2 branches off from between a portion of the first oil path L1 to which the check valve 15 and the accumulator 21 are connected. The third oil path L3 branches off from between a portion of the first oil path L1 to which the oil pump 11 is connected and the check valve 15. The fourth and fifth oil paths L4 and L5 branch off from the third oil path L3.

The oil pump 11 sucks up the working oil from an oil sump accumulated on an oil pan 33 via a strainer 35 that eliminates foreign substances. An oil temperature sensor 37 configured to detect a temperature of the working oil is installed on the oil pan 33.

The transmission control unit 14 is constituted by an electronic control unit (ECU) constituted by a CPU, a memory 14a serving as a storage device, a receiver unit 14b, or the like, and controls the first to fifth electromagnetic valves 17 and 25 to 31, of which there are five, and the pressure regulating valve 19 by executing a control program stored in the memory 14a serving as the storage device using the CPU on the basis of predetermined vehicle information such as an oil temperature, a vehicle speed, an accelerator position, an engine rotational speed, and so on, of which there are directly or indirectly received by the receiver unit 14b.

Figure 3:
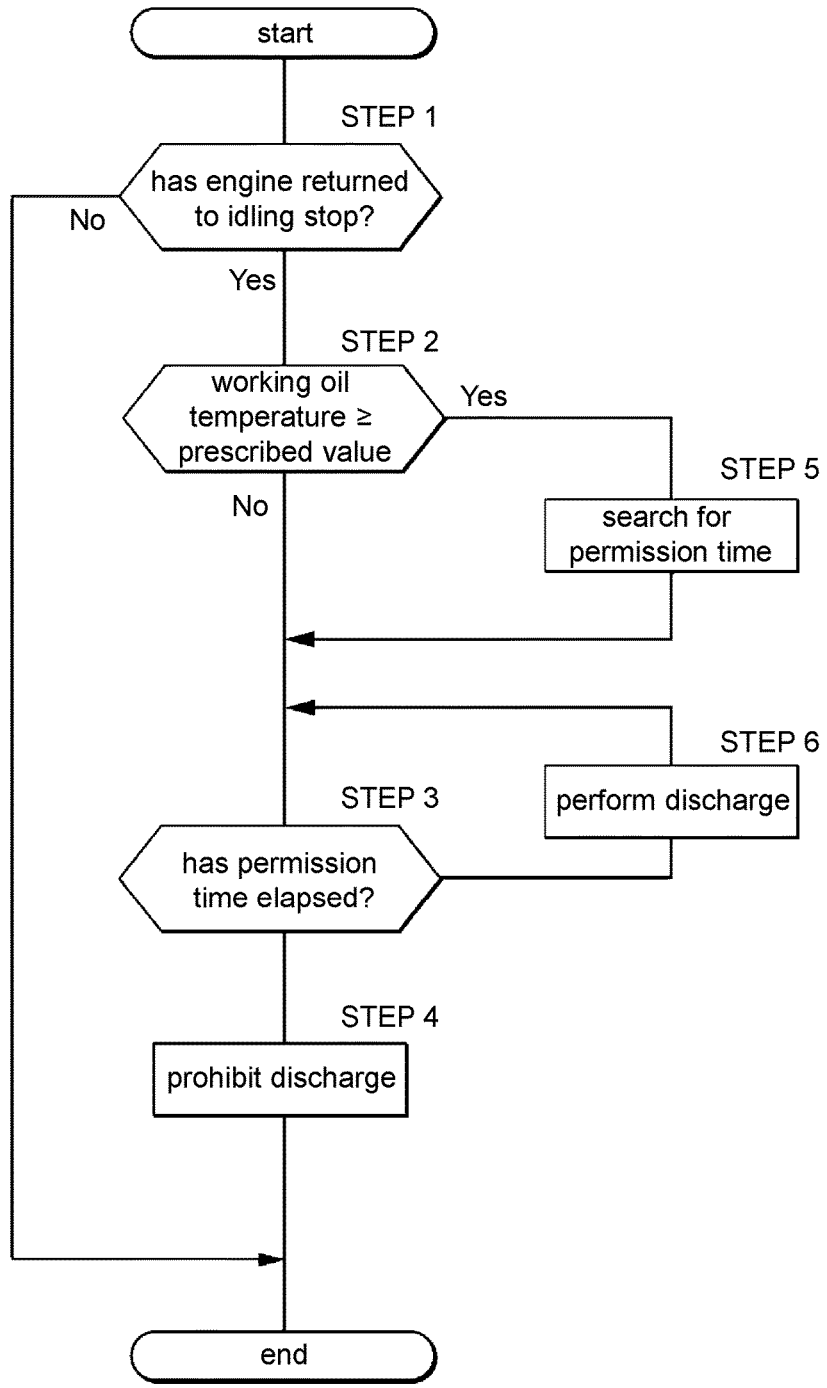
FIG. 3 is a flowchart of an operation example of a transmission control unit of the embodiment.

Here, the vehicle V of the embodiment performs idling stop that stops the engine E when a predetermined condition such as halting or the like is provided. FIG. 3 shows processing when the transmission control unit 14 returns to an idling state in which the engine E is started from an idling stop.

Describing a flowchart in FIG. 3, first, in STEP 1, it is checked whether a starting request (a return request) for stopping an idling stop and starting the engine E has been supplied to a general control unit (a control unit integrating a plurality of ECUs including the transmission control unit 14) or the like mounted on the vehicle V.

When a return request has not been requested, the current processing is terminated at this time. When a return request has been requested in STEP 1, the processing proceeds to STEP 2, and whether a temperature of working oil detected by the oil temperature sensor 37 is a predetermined prescribed value θ1 or more is checked.

Figure 4:
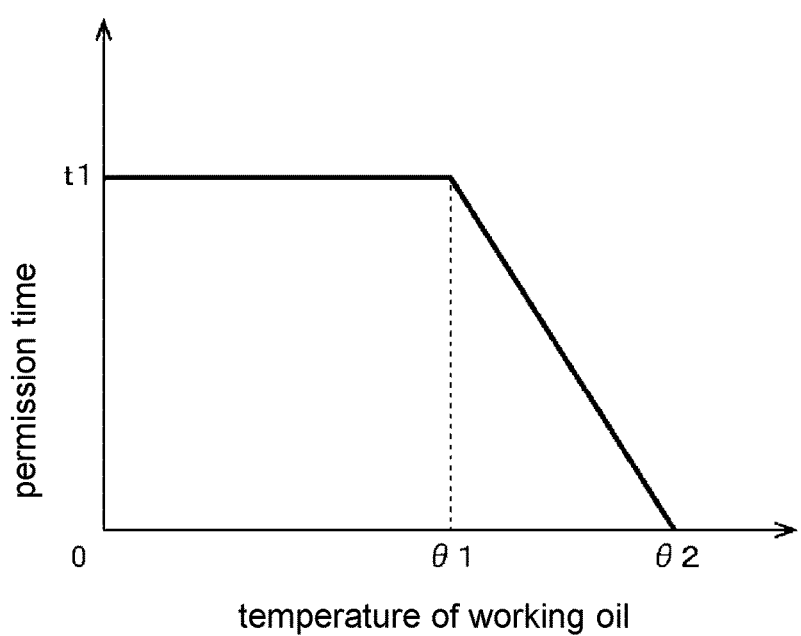
FIG. 4 is a graph showing a relation between a temperature and a permission time of working oil of the embodiment.

Here, the predetermined prescribed value θ1 will be described. FIG. 4 is a graph showing a relation between a temperature of the working oil and a time (a permission time) in which discharge of the working oil is permitted during returning from an idling stop of the accumulator 21 under a predetermined condition such as a weight of the vehicle V, characteristics of the engine E, a gear ratio of the automatic transmission 3, or the like. In the graph of FIG. 4, a horizontal axis represents a temperature (° C.) of the working oil, and a vertical axis represents a permission time (for example, milliseconds)

In the transmission control unit 14 of the embodiment, a permission time until the temperature of the working oil is the predetermined prescribed value θ1 or more is set to a certain time t1, and when the temperature of the working oil is the predetermined prescribed value θ1 or more, the permission time is gradually reduced from t1 in proportion to an increase in the temperature of the working oil and the permission time when the temperature of the working oil is a predetermined upper limit value θ2 is set to 0.

Accordingly, when the temperature of the working oil is the predetermined prescribed value θ1 or more, the permission time can be set to t1 without referring to map data stored in the storage unit.

Hence, in the transmission control unit 14 of the embodiment, t1 as an initial value of the permission time is stored in the memory 14a. Then, in STEP 2, when the temperature of the working oil (a working oil temperature) is the predetermined prescribed value θ1 or more, the processing proceeds to STEP 3, and it is checked whether the permission time (t1) has elapsed. When the permission time (t1) has elapsed, the processing proceeds to STEP 4, supply of electric power to the first electromagnetic valve 17 is cut off and the first electromagnetic valve 17 is closed to block supply of the working oil pressure accumulated in the accumulator 21 to the first brake B1, and use of the accumulator 21 is terminated. Then, the permission time (t1) is reset (returned to t1), and the processing of this time is terminated. The transmission control unit 14 repeatedly performs the processing of FIG. 3 during an idling stop at predetermined control intervals.

In STEP 2, when the temperature of the working oil is the predetermined prescribed value θ1 or more, the working oil branches in STEP 5, and a permission time is searched for and set on the basis of map data or a computing equation previously stored in the storage unit on the basis of the graph shown in FIG. 4 and stored in the memory 14a as a new permission time.

Then, the processing proceeds to STEP 3, and it is checked whether the permission time has elapsed on the basis of the new permission time. When the permission time has not elapsed, the processing proceeds to STEP 6, electricity is applied to the first electromagnetic valve 17, the accumulator 21 is released, and the pressure accumulated by the accumulator 21 is used for engagement of the first brake B1.

When the permission time has elapsed in STEP 3, the processing proceeds to STEP 4, supply of electric power to the first electromagnetic valve 17 is cut and the first electromagnetic valve 17 is opened to prevent the working oil pressure accumulated in the accumulator 21 from being used in the first brake B1. Then, the permission time set in STEP 5 is reset by returning to t1, and the processing of this time is terminated. The transmission control unit 14 repeatedly performs the processing of FIG. 3 during the idling stop at predetermined control intervals.

Further, in STEP 2, it is checked whether the temperature of the working oil is the predetermined upper limit value θ2 or more, and when the temperature is the predetermined upper limit value θ2 or more, the processing may proceed to STEP 4 without passing through STEP 5.

Here, a leakage amount from a gap in a valve such as an electromagnetic valve, a pressure replating valve, or the like, varies as a viscosity or the like of the working oil (working fluid) varies due to a temperature. Accordingly, even if the pressure accumulated by the accumulator 21 is sufficient at the time of a low temperature, the pressure accumulation may be insufficient at the time of a high temperature. Accordingly, when accumulation of pressure at a large capacity and a high pressure is performed to enable parking locking even at the time of a high temperature, unnecessary pressure accumulation may remain in the accumulator 21 at the time of a low temperature.

Here, in the transmission control unit 14 of the embodiment, the permission time of the pressure accumulation used in the first brake B1 (the engaging mechanism) is selected and set according to the temperature of the working oil. Accordingly, due to decrease in leakage rate at the time of a low temperature, the pressure accumulated by the accumulator 21 can be used in the first brake B1, leaving an accumulated pressure sufficient for locking the parking lock at the time of a low temperature. Accordingly, regardless of the temperature of the working oil, appropriate pressure accumulation can remain for parking locking, and wastage of the pressure accumulated by the accumulator 21 can be reduced. In addition, even if the vehicle power supply is lost due to a breakdown or the like at the time of returning, the accumulator 21 is released, the parking piston is moved toward the locked side using the pressure accumulated by the accumulator 21, and the parking lock can be locked.

In addition, in the transmission control unit 14 of the embodiment, when the temperature detected by the oil temperature sensor 37 is the predetermined upper limit value θ2 or more, even if the restarting request of the engine E is received by the transmission control unit 14, supply of the working oil pressure to the first brake B1 from the accumulator 21 is prohibited (in the flow of FIG. 3, it flows in sequence of YES in STEP 2, θ2 or more in STEP 5, the permission time 0 in STEP 3, and STEP 4).

According to the transmission control unit 14 of the embodiment, when the temperature of the working oil exceeds the predetermined upper limit value θ2 by too much, pressure accumulated in the accumulator 21 can be left for the parking locking without using the entire pressure accumulation for engagement of the first brake B1 during returning to idling. Further, the predetermined upper limit value θ2 can be previously set to obtain a temperature of the working oil that may not appropriately perform parking locking as long as the entire pressure accumulated by the accumulator 21 does not remain.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A power transmission control device configured to control a power transmission, the power transmission comprising:
   an engaging mechanism that is fastened upon departure of a vehicle;
   a pressure regulating valve configured to regulate a pressure of a working fluid for the engaging mechanism;
   a pressure accumulator configured to accumulate a pressure in the working fluid;
   a temperature detecting unit configured to detect a temperature of the working fluid;
   a parking piston configured to switch between locking and unlocking of a parking lock mechanism; and
   an opening/closing valve configured to allow supply of the working fluid to the parking piston to switch the parking piston to a locked side,
   wherein the power transmission control device comprising:
   a storage unit configured to relate and store a temperature of the working fluid and a permission time in which release of the pressure accumulator is allowed; and
   a receiver unit configured to receive restart information of a prime mover mounted on the vehicle,
   wherein the vehicle is able to execute idling stop control that stops the prime mover upon halting,
   the pressure accumulator is connected to supply the working fluid, in which the pressure is accumulated, for the engaging mechanism and the parking piston, and
   the power transmission control device sets the permission time corresponding to the temperature of the working fluid detected by the temperature detecting unit on the basis of memory in the storage unit, and
   the working fluid, in which the pressure is accumulated by the pressure accumulator, is supplied to the engaging mechanism only during the permission time when restart information of the prime mover is received, while the vehicle performs the idling stop control.

2. The power transmission control device according to claim 1, wherein, when the temperature detected by the temperature detecting unit is a predetermined upper limit temperature or more, even if the restart information of the prime mover is received, supply of the working fluid, in which the pressure is accumulated by the pressure accumulator, for the engaging mechanism is prohibited.

3. A power transmission comprising: the power transmission control device according to claim 1, the engaging mechanism that is fastened upon departure of the vehicle, the pressure regulating valve configured to regulate a pressure in the working fluid for the engaging mechanism, the pressure accumulator configured to accumulate a pressure in the working fluid, and the temperature detecting unit configured to detect a temperature of the working fluid.

4. A vehicle comprising the power transmission according to claim 3, the prime mover configured to transmit power to the power transmission, and a drive wheel to which power output from the power transmission is transmitted.

5. A power transmission comprising: the power transmission control device according to claim 2, the engaging mechanism that is fastened upon departure of the vehicle, the pressure regulating valve configured to regulate a pressure in the working fluid for the engaging mechanism, the pressure accumulator configured to accumulate a pressure in the working fluid, and the temperature detecting unit configured to detect a temperature of the working fluid.

6. A vehicle comprising the power transmission according to claim 5, the prime mover configured to transmit power to the power transmission, and a drive wheel to which power output from the power transmission is transmitted.

* * * * *